United States Patent [19]

Widener

[11] 4,119,195
[45] Oct. 10, 1978

[54] PROTECTIVE CASE

[76] Inventor: Charles D. Widener, 9 Coach Rd., Rolling Hills, Calif. 90274

[21] Appl. No.: 789,779

[22] Filed: Apr. 22, 1977

Related U.S. Application Data

[63] Continuation of Ser. No. 579,024, May 19, 1975, abandoned.

[51] Int. Cl.$^2$ .................... B65D 25/14; B65D 43/16; B65D 81/26; B65D 85/67
[52] U.S. Cl. .................................. 206/204; 206/387; 220/343; 220/408
[58] Field of Search .............................. 206/204–205, 206/387, 455–456, 493; 220/334, 337–338, 340, 342–344, 63 R, 65

[56] References Cited

U.S. PATENT DOCUMENTS

| | | | |
|---|---|---|---|
| 1,950,465 | 3/1934 | Whitlock | 220/343 X |
| 2,442,873 | 6/1948 | Graham | 220/343 |
| 2,474,311 | 6/1949 | Graham | 220/343 |
| 2,557,048 | 6/1951 | Haase | 220/343 |
| 2,812,231 | 11/1957 | Zar | 206/204 X |
| 2,969,891 | 1/1961 | Presnick | 220/344 X |
| 3,003,658 | 10/1961 | Lindsey | 220/63 R X |
| 3,128,135 | 4/1964 | Ege | 206/204 X |
| 3,250,585 | 5/1966 | McQuarrie et al. | 220/342 X |
| 3,443,093 | 5/1969 | Lindenmuth et al. | 206/455 X |
| 3,737,067 | 6/1973 | Palson | 206/387 X |

FOREIGN PATENT DOCUMENTS 478,793 10/1939 United Kingdom ..................... 206/204

OTHER PUBLICATIONS

Radio Engineer's Handbook, Terman, McGraw-Hill Book Co., Inc. (New York 1943).
Standard Handbook For Electrical Engineers, Knowlton, Ed.-in-Chief, McGraw-Hill, Inc. (New York 1949).

Primary Examiner—Steven E. Lipman
Attorney, Agent, or Firm—Robert M. Ashen

[57] ABSTRACT

A protective casing for removably retaining an environment-sensitive object such as a recording tape cartridge or a tape cassette and protecting such object from contamination as by dirt, dust, magnetic radiation, humidity, and temperature. The illustrated casing comprises rectangularly shaped upper and lower case sections which are hingedly connected together along one edge and maintained in that relationship by means of an elongated resilient wire torsion spring. The spring and portions of the case section edges combine to form the hinge for the casing. The case sections form a "clamshell" construction, with the spring also serving to continuously bias the sections to a closed position against one another. The case may be manually opened and held open against the biasing force of the spring which will automatically reclose the casing as soon as it is released. The interior cavity of the casing is substantially sealed from the external atmosphere by means of a seal which extends along the periphery of one of the case sections. A humidity absorbing device and shield against magnetic radiation may also be provided in the casing. The humidity absorbing device is in a unique arrangement compatible with the limiting requirements regarding space, absorbing capacity, and absence of contamination. In this way, a tape cartridge or other environment-sensitive object retained within the casing is essentially sealed from the external atmosphere and protected from degrading environments.

7 Claims, 8 Drawing Figures

U.S. Patent     Oct. 10, 1978     4,119,195
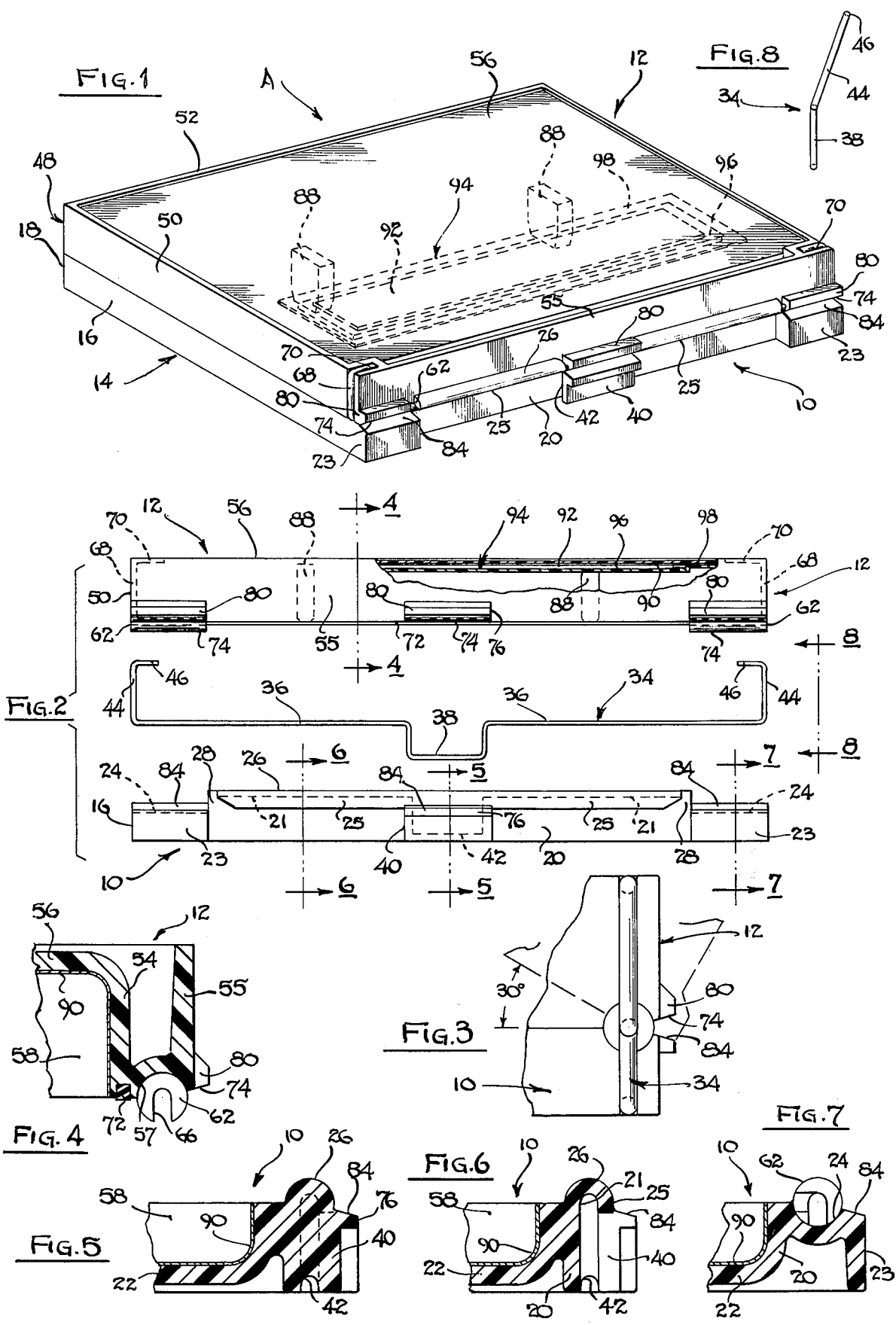

PROTECTIVE CASE

This is a continuation, of application Ser. No. 579,024, filed May 19, 1975, now abandoned.

BACKGROUND OF THE INVENTION

This invention relates in general to cases for removably retaining environment-sensitive objects such as tape cartridges.

With the widespread increase in the use of magnetic tape for digital and analog recording and reproduction, many of these tapes are stored in cassettes, such as the so-called "Phillips-type" cassettes, and other cartridges of various configurations. Tapes stored in such cartridges are finding increased acceptance in many industrial and consumer markets where reel to reel tapes have previously been employed.

However, it has become widely recognized that the performance of these tapes is reduced considerably and their physical integrity impaired by contaminants such as dirt and dust. Even moreso, but less readily apparent, are the highly detrimental effects of humidity, elevated temperature, and magnetic and electromagnetic radiation. Immediate loss of recorded data may occur by subjecting the recorded tape to magnetic radiation. Exposure of tapes to humidity and elevated temperatures over a period of time may also have a detrimental effect on the performance and physical integrity of the tape. While these effects are not fully understood, it is known that exposure to elevated temperatures and/or humidity for a relatively short period of time (as when a tape is in a closed car in the sunlight) can cause marked degradation of the binders that physically hold the magnetic oxide to the tape. After such degradation, the oxide coating will start to flake off in the form of very small particles, which may occur after a period of several months. This effect can be extremely costly, particularly in digital recording techniques where packing density of 1,000 bits of data per linear inch are not uncommon. It is also known that not only is humidity itself detrimental to the tapes, but that reducing humidity also gives increased resistance to elevated temperatures (e.g., the oxide binders do not degrade as badly from elevated temperature when moisture level is reduced).

The present commercially available cases for environment-sensitive objects such as tape cartridges have various limitations and disadvantages including their failure to provide adequate and/or dependable protection from the deleterious effects of various elements of the external environment.

The present invention obviates these and other problems. In the form illustrated and described hereinafter there is a case comprised of two case sections which are each quadrilaterally shaped and hingedly connected together along one edge. An elongated torsion spring is used both to connect the two case sections together and to continuously bias them to the closed position. In the illustrated construction, the spring continues to bias the casing closed as the case sections are moved to an open position, and the casing will automatically shut when the sections are released. The need for a latch or the like is eliminted.

When the two case sections are in the closed position, an interior chamber is formed which is sized and shaped to retain the desired object. A pliable and resilient seal may be affixed to the peripheral edge of one of the case sections to maintain an air-tight seal around the entire case periphery when the two case sections are closed. In addition, a radiation shield may be provided, and a moisture absorbing material, such as a desiccant, may be located on the inner face of one of the case sections to dehumidify the chamber when the case is closed. The desiccant may be provided in a manner which both provides the desired moisture-absorbing capability and protection to the interior environment of the casing. Furthermore, a reflective exterior finish may be provided on the case to aid in reducing internal temperatures due to the sunlight or other radiated thermal energy.

The present invention also provides a unique method for assembling the two case sections, with the case sections being designed so that they can be very quickly and easily assembled by means of a torsion spring. In this connection, the spring may be simply bent and manipulated so as to interlock with the case sections.

It is, therefore, the primary object of the present invention to provide a case for removably retaining and protecting an environmentally sensitive object.

It is another object of the present invention to provide a case of the type stated where two case sections are held together and biased to a closed position by a simple torsion spring means.

It is another object to provide such case which provides an effective seal without the necessity for latch means or the like.

It is another object to provide a unique arrangement for removal of moisture from such a case.

It is a further object of the present invention to provide a case of the type stated which can be constructed in a wide variety of sizes and shapes in order to accommodate various forms of objects.

It is an additional object of the present invention to provide such a case which can be manufactured at a relatively low unit cost on a mass-production basis.

It is another salient object of the present invention to provide a method of assembling such a case where two case sections can be assembled quickly and easily with a minimum amount of manual labor.

It is a further object to provide such a method of assembly whereby the case sections are mechanically interconnected by the simple manipulation and interengagement with the case sections of a preformed wire torsion spring.

With the above and other objects in view, my invention resides in the novel features of form, construction, arrangement, and combination of parts presently described and pointed out in the claims.

BRIEF DESCRIPTION OF THE DRAWINGS

Having thus described the invention in general terms, reference will now be made to the accompanying drawings in which:

FIG. 1 is a perspective view from the rear of a case for removably retaining a magnetic recording tape cassette which is constructed in accordance with and embodies the present invention;

FIG. 2 is an exploded rear elevational view of the case of FIG. 1 and showing the lid and the base and the spring forming a part thereof;

FIG. 3 is a fragmentary, enlarged and elevational view of a rear corner portion of the lid forming part of the case, and taken along the left side of the case, reference being made to FIG. 1;

FIG. 4 is a vertical sectional view taken along line 4—4, through the case lid, of FIG. 2;

FIG. 5 is a vertical sectional view taken along line 5—5 of FIG. 2;

FIG. 6 is a vertical sectional view taken along line 6—6 of FIG. 2;

FIG. 7 is a vertical sectional view taken along line 7—7 of FIG. 2; and

FIG. 8 is an end elevational view taken along line 8—8 of FIG. 2 showing the spring.

DETAILED DESCRIPTION

Referring now in more detail and by reference characters to the drawings which illustrate a preferred embodiment of the present invention, A designates a case for removably retaining magnetic tape cartridges as more fully illustrated in FIG. 1 of the drawings.

As used herein, the term "tape cartridge" is used in its generic sense to refer to all forms of housings for magnetic recording tape in which the tape is spooled within the housing. In this case, the tape is normally spooled in such manner that it is capable of being unspooled and withdrawn from the housing or, otherwise, traversed across an opening in relation to a magnetic recording and reproducing head and thereafter rewound on another spool located within the housing. Exemplary of such types of cartridges which may be used in the case of the present invention are the so-called "Phillips-type" tape cassettes. The tape cartridges of the type capable of being used in connection with the present invention are capable of being used in both digital and analog recording systems, where the analog recording is normally that of audible recordings.

In many conventional forms of construction, these cartridges comprise an outer housing which includes a spool or shaft upon which the tape is wound and unspooled or unwound to traverse across an opening in relation to one or more tape heads and rewound on another spool or shaft. Thus, while this form of cartridge is only one of the cartridges which may be removably retained in the case of the present invention, the case of the invention is described in connection with cartridges which are the "Phillips-type" cartridges.

It will be appreciated that while the detailed description is of a tape cartridge, the invention, in its broader aspects, has application to other forms of environment-sensitive objects, such as magnetic cards, film, or semiconductor components.

The case A generally comprises a first case section, in the form of a base section, designated by reference numeral 10, and a second case section, in the form of a lid section, designated by reference numeral 12 of the drawings. The base section 10 generally comprises a rectangularly shaped peripheral wall 14 comprised of a pair of spaced apart generally parallel transverse side walls 16 connected by generally parallel longitudinally extending front and rear walls 18 and 20, respectively.

Extending across the four walls 16, 18, and 20 is a relatively flat planar bottom wall 22 (FIG. 5), which is preferably located somewhat intermediate the upper and lower edges of the peripheral wall 14. Consequently, it can be observed that the wall 14 extends below the bottom wall 22 and forms a lower support margin which effectively holds the bottom wall 22 in spaced relation to a supporting surface. In this way, a tape cartridge retained on the bottom wall 22 is held in spaced relation to any supporting surface, thereby insulating the cartridge from temperature and other deleterious conditions which might be otherwise conductively transmitted to the tape retained in the tape cartridge.

The rear wall 20 is provided at either end with an integrally formed block portion 23. Each portion 23 defines on its upper surface (which is level with the top edge of rear wall 20) a longitudinally-extending upwardly facing semi-circular groove 24, as illustrated in FIG. 7 of the drawings. Integrally formed with the upper edge of the rear wall 20 and located centrally between the two end block portions 23 is an upwardly projected, somewhat cylindrically shaped portion 26, as more fully illustrated in FIGS. 1 and 5 and 6 of the drawings. More particularly, portion 26 extends upwardly and rearwardly from the upper edge of rear wall 20, in a generally semi-circular exterior configuration. Portion 26 includes two side sections 25 which are spaced at their outward ends from the end block portions 23, thereby defining openings 28. The lower outer edges of the base side sections 25 are beveled as shown in FIG. 2 to accommodate assembly of this spring as will be explained. The side sections 25 merge at their inward ends with a rear center boss 40. Each side section 25 defines a downwardly directed groove 21 as shown best in FIG. 6. The grooves 21 of sections 25 are generally aligned with an in the same common vertical plane with the grooves 24 of end block portions 23. The central boss 40 is integrally formed with the rear wall 20, centrally of its ends. The boss 40 defines a downwardly facing U-shaped groove 42. The groove 42 is generally in the same common vertical plane with grooves 24 and 21.

The lid section 12 includes a rectangularly-shaped, vertical peripheral wall 48 comprised of a pair of spaced apart, generally parallel transverse side walls 50, which are connected at their ends by generally parallel, longitudinally extending front and rear walls 52 and 54, respectively. Extending across the four walls 50, 52, and 54 is a relatively flat rectangular top wall 56. Top wall 56 is generally of the same rectangular size and shape as bottom wall 22, and the side, front, and rear walls 50, 52, and 54 of the lid section are proportioned to align and be coextensive with the respective side, front, and rear walls 16, 18, and 20 of the base section, when the case sections are assembled together. The top wall 56 is preferably spaced from the upper edge of the peripheral wall 48. In this way, it can be observed that the top wall 56 would be located in spaced relationship to a supporting surface in the event that the cartridge A were turned upsidedown. However, it can also be observed that the top wall 56 is sufficiently spaced from the bottom wall 22 by a distance sufficient to form an interior chamber 58 which is sized to removably retain a conventional tape cartridge when the lid section 12 is closed with respect to the base section 10.

The lid section 12 is also provided at its rear wall 54 with hinge portions that cooperate and interlock with hinge portions of the base section 10 (and with the spring 34) to provide the hinged connection for the casing.

More particularly, the rear wall 54 has an integrally formed, rearwardly extending portion 55 which is generally coextensive with rear wall 54. At each side of the casing, the rear portion 55 has an integrally formed, downwardly extending end hinge portion 62. Each portion 62 has a downwardly facing generally cylindrical exterior configuration which is adapted to be rotationally received in the groove 24 of a portion 23 of the base section when the case sections are assembled. Centrally of the portions 62, the lower edge of the rear portion 55 is formed with a downwardly facing and elongated semicircular central groove or recess 57 (FIG. 4). Groove 57 is adapted to rotationally receive central hinge portion 26 of the base section when the casing is assembled. It will be noted that the end hinge portions 62 and the central groove 57 are generally aligned and in a common vertical hinge plane. Further, it will be noted that when the casing sections are assembled, the vertical hinge planes of the lid and base sections are generally coincident with one another. The central hinge portion 26 is slightly shorter than the central groove 57, whereby in the assembled case the ends of the portion 26 are juxtaposed to the inward ends of the end hinge portions 62 to limit side-to-side relative movement between the lid and base sections. The rear portion 55 is provided with grooves to receive portions of a torsion spring 34. In this connection, a groove 66 is formed along the lower edge of each end hinge portion 62. Further, at each side of the rear portion 55 the groove 62 is continued with a vertically extending groove 68 which extends the full height of the rear portion 55. Each vertical groove 68 is further continued in the inward direction along the top edge of rear portion 55 by a horizontal groove 70.

FIGS. 2 and 8 show a resilient preformed wire torsion spring 34, which interlocks with the casing sections and serves both as a spring means and as a hinge means. FIG. 2 shows the spring 34 in its preformed configuration prior to assembly. It is shown disposed in a vertical plane for convenience, since it assumes this orientation when assembled in the casing. This spring 34 includes a pair of horizontally disposed relative straight sections 36 which are integrally connected at their inward ends to a downwardly extending U-shaped retaining section 38. At their outward ends, the straight sections 36 each merge into upstanding arm sections 44 which also incline forwardly at about an angle of 15° to 25° (FIG. 8). At the upper end of each arm section 44, there is integrally formed an inwardly directed tab section 46.

To assemble the casing, the spring 34 is first interengaged with the base section 10. To accomplish this the spring 34 may be bent into an overall, downwardly curving arc so that the two straight sections 36 extend generally upwardly and outwardly from the center. With the spring in this bent condition the sections 36 are inserted through the openings 28. The beveled edge on one of the base side sections 25 facilitates this insertion. The bending tension on the spring is then released and it is guided into interlocking engagement with the base section 10. In this regard the U-shaped section 38 is received in the U-shaped groove 42 and the straight sections 36 each extend in and along grooves 21 and 24.

Next, the lid section 12 may be positioned relative to the base section 10 as shown in FIG. 1. Lid end portions 62 are received in base grooves 24 and base center portion 26 is received in lid central groove 57. This forms the pivotal hinge interconnection and interengagement between the lid and base sections. To accommodate the aforesaid positioning of the lid section on the base section, the arm sections 44 of the spring are bent outwardly to either side. In addition, arm sections 44 are bent rearwardly toward the rear wall of the casing, to generally vertical positions. The spring arm sections 44 (and tab sections 46) may be then released and manipulated so that the arm sections 44 are received in the vertical lid grooves 68 and the tab sections 46 are received in the horizontal lid grooves 70.

The spring 34 is now mechanically interlocked with the lid and base sections, and said sections are thereby interlocked to one another for pivotal movement about the casing hinge. As noted above, the hinge is formed by the lid end portions 62 and center groove 57, by the base grooves 24 and center portion 26, and by the spring 34. Thus while the casing is closed the hingedly connected rear edges of the case sections define a common vertical end plane in which the spring is disposed. Different portions along the spring are secured respectively to the upper and lower case sections. When the casing is opened, the spring is subjected to a torsional or twisting force, with the portions of the spring that are secured to the respective casing sections thereby moving into different planes which are at an angle to one another.

By particular reference to FIG. 2, it can be observed that in their preformed condition the arm sections 44 extend upwardly with respect to the straight sections 36 and are also angularly inclined forwardly, as previously stated. Thus, when the arm sections 44 and the tab sections 46 are retained within the slots 68 and 70, respectively, they tend to bias the lid section 12 to the closed position over the base section 10. Consequently, it can be observed that the spring 34 both holds the casing sections hingedly together and bias the lid section 12 to the closed position. The spring 34 loads the lid section 12 with respect to the base section 10 so that the lid section contacts the base section with pressure provided by the spring. This spring pressure provides adequate closure for the case and eliminates the need for a latch or the like.

The spring 34 may be formed of material such as music wire. A spring of about 18 gauge music wire has been found to operate effectively.

In order to seal the chamber 58 when the lid section 12 is closed with respect to the base section 10, a sealing element 72, in the form of a sealing ring (FIG. 4), may be provided along the lower edge of the lid peripheral wall 48. This sealing element 72 will normally extend around the entire periphery of the wall 48 and will engage the upper edge of the base peripheral wall 14 when the lid section 12 is closed with respect to the base section 10. The sealing ring 72 may be formed of any of a number of known sealing materials, as for example, silicone rubber or the like.

By reference to FIGS. 3 and 4, it can be observed that means are provided to limit the amount by which the case can be opened. The lid section has three transversely spaced apart, rearwardly extending integrally formed stops 80 which each have a lower stop face 74 which is inclined upwardly with respect to the horizontal at an angle of about 15°. The stops 80 are located at approximately the level of the lower edge of the lid rear wall 54. The base section has three transversely spaced apart, generally upwardly facing stop faces 84 which are inclined downwardly at an angle of about 15° with respect to the horizontal. Two of the stop faces 84 are formed on the block portions 23, while the third stop face 84 is formed on a rearward extension 76 of the boss 40. Stop faces 84 and 74 are in alignment so that, as shown in FIG. 3, when the case is opened the stop faces abut one another to limit the amount by which the case can be opened to a maximum of about 30°.

Moreover, since the lid 12 is always biased to the closed position, it can be observed that the case A will not maintain itself in an open position, but as soon as it is released it will return to the closed position. This prevents the case from being inadvertently left open, which would permit contamination of the contents and reduce the life of the dehumidifier.

The lid and the base sections may both be molded individually from any of a number of known plastic materials including polyethylene, polystyrene, polybutadiene, various vinylidene compounds and the like. Moreover, any of a number of molding operations can be used to produce these various components, including thermo-forming, injection molding, blow molding, etc. Notwithstanding, it should also be observed if desired that the lid and the base sections could be formed in other operations and of other materials including metal.

The downwardly presented surface of the top wall 56 may be provided with a pair of downwardly extending longitudinally spaced and aligned prongs 88. These prongs 88 are located so as to extend through the apertures normally existing in a tape cartridge such as the Phillips-type cassette to prevent rotation of the reels of the cassette.

To protect against magnetic or electromagnetic radiation, magnetic shielding material such as a metal foil layer or sheet 90 (FIGS. 4–7) may be disposed within each case section and secured in place as by a pressure-sensitive adhesive or other suitable means. A nickel/iron foil having a relatively high nickel content would be a desireable foil for this purpose.

An important requirement for the casing is the maintenance within it of a relatively low humidity. While there are commercially available moisture absorbing or controlling materials such as desiccant, the use of such material in the present application involved overcoming certain problems arising from limitations and requirements of such application. In this regard, there is a requirement that the humidity control means occupy a minimum of space afforded between the foil shields 90 and the tape cassette. In addition, the humidity-control means has to afford adequate moisture absorbing capability but it must not itself contaminate the interior environment of the casing as by shredding, flaking, or otherwise physically or chemically decomposing in whole or in part into that interior.

The illustrated casing is provided with a thin rectangular strip 92 of paper permeated with desiccant crystals. The thickness of this strip may be on the order of 0.050 inches. The strip 92 is secured to the underside of the lid foil shield 90 by means of a permeable or breathing retainer member 94. The illustrated member 94 comprises a very thin sheet section of a breathing material such as cellulose acetate. The member 94 is formed, as by vacuum forming, into a rectangular container portion 96 which receives the strip 92, and a peripheral flange portion 98 which is secured, as by a suitable adhesive to the underside of the foil 90. The member 94 may be formed of a sheet having a thickness in the order of 0.007 inches. The overall thickness of the formed member 94 may be in the order of about 0.080 inches. Thus, a very compact but effective moisture control structure is provided. If the foil shield is omitted, the member 94 can be secured directly to the underside of the top wall 56.

The case could be molded of a light colored material or its exterior surface finished with a highly reflective finish in order to help reduce internal temperatures as a result of the impingement of sunlight or other radiated thermal energy.

To place a cassette into the casing, the lid section may be pivoted open and the cassette inserted by sliding it over the interior of the bottom wall and into position within the base peripheral walls. The lid sections may then be allowed to close against the base section. To remove the cassette the operation is simply reversed.

Thus, there has been illustrated and described a unique case for removable retaining environment-sensitive objects such as a magnetic tape cartridge and the like, and which is constructed so that the lid of the case is always biased to the closed position and which fulfills all of the objects and advantages sought therefor. It should be understood, however, that many changes, modifications, variations, and other uses and applications will become apparent to those skilled in the art after considering this disclosure and the accompanying drawings. Therefore, any and all such changes, modifications, variations, and other uses and applications are deemed to be covered by the invention which is limited only by the following claims.

I claim:

1. In a protective casing for removably retaining an environment-sensitive object,
    said casing comprising a base section and a lid section which are hingedly connected together and are movable relative to one another between a closed position and an open position;
    said base section being generally rectangular and having side, front, and rear edges, said base section having a generally rectangular bottom wall, a pair of generally upstanding base side walls, a generally upstanding base front wall, and a generally upstanding base rear wall, said upstanding walls each having an upper edge, said upper edges combining to define a generally continuous and rectangular, upwardly-facing, base contact edge;
    said lid section being generally rectangular and having side, front, and rear edges, said lid section having a generally rectangular top wall of essentially the same size as said bottom wall, a pair of generally upright lid side walls, a generally upright lid front wall, and a generally upright lid rear wall, said upright lid walls each having lower edge, said lower edges combining to define a generally continuous and rectangular, downwardly-facing lid contact edge of essentially the same size as said base contact edge, and being aligned and in contact with said base contact edge when said casing is in the closed position;
    said casing also comprising base hinge means on said base section and lid hinge means on said lid section, said base hinge means being interengaged with said lid hinge means to form a hinged connection between said lid and base sections, said hinged connection being located at the rear edges of said lid and base sections and forming an elongated hinge axis for pivotal movement of said lid section relative to said base section about said hinge axis of said hinge connection to the open position; the improvement comprising, in combination with the foregoing casing structure, a preformed resilient wire torsion spring interengaged with said base section and with said lid section so as to retain said base hinge means interengaged with said lid hinge means, and so as to apply a continuous closing force which urges said lid contact edge and said base contact edge against one another from all open positions of said casing sections, said wire spring being elongated and extending generally the length of said rear edges of said casing sections, said spring having opposite ends disposed at opposed sides of said casing sections, said spring comprising a connector portion at each of its ends connected to one of said casing sections, a connector section intermediate its ends connected to the other of said casing sections, and a pair of elongated torsion portions extending essentially the full length of said rear edges of said casing and each having a longitudinal axis, each of said torsion portions being integrally formed with and extending between said intermediate connector section and one of said end connector sections, said spring being constructed and arranged with regard to said lid and base sections so that said elongated torsion portions are resiliently twisted about their longitudinal axes at all times so as to continuously apply said closing force, said lid section and said cover sections each being unitary molded plastic, said lid hinge means being integrally formed with the remainder of the lid section and said cover hinge means being integrally formed with the remainder of the cover section, said base hinge means being positioned to engage said lid hinge means so as to limit relative movement between said lid section and said base section in the direction of such hinge axis, said hinge means including elongated grooves in which said portions of said spring are received, each of said spring end connector portions comprising a first part extending generally perpendicular to the torsion portions and a second part at the outer end of said first part, said second part extending generally transversely to said first part and being received in a mating recess in the casing section to which said end connector portion is connected to thereby effect said last mentioned connection.

2. The casing of claim 1 for retaining a tape cassette having a pair of spaced sprocket holes, said lid section including a pair of depending tabs positioned to be received in the sprocket holes of the cassette.

3. The casing of claim 1 wherein a resilient sealing means is disposed along one of said contact edges.

4. The casing of claim 3 wherein means for shielding against magnetic radiation is provided over at least a major portion of the interior of said casing sections.

5. The casing of claim 3 wherein means for dehumidifying the interior of the casing is provided within said casing.

6. The casing of claim 5 wherein said dehumidifying means comprises a thin layer comprising dehumidifying material a thin layer of covering material having the capacity to pass moisture therethrough, said dehumidifying material being positioned juxtaposed one of said planar walls, said layer of covering material being positioned over said layer of dehumidifying material outwardly of said planar wall and completely separating said dehumidifying material from the interior of said casing, and means securing said dehumidifying and covering material in said positions.

7. The casing of claim 5 wherein said dehumidifying means comprises a layer of paper impregnated with desiccant crystals.

* * * * *